(12) United States Patent
Kameyama et al.

(10) Patent No.: US 7,549,904 B2
(45) Date of Patent: Jun. 23, 2009

(54) METAL GASKET FOR MARINE ENGINE

(75) Inventors: Takuma Kameyama, Shizuoka (JP);
Takanobu Suzuki, Shizuoka (JP);
Hiroyuki Matsumoto, Saitama (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 143 days.

(21) Appl. No.: 11/829,820

(22) Filed: Jul. 27, 2007

(65) Prior Publication Data
US 2009/0020961 A1    Jan. 22, 2009

(30) Foreign Application Priority Data
Jul. 27, 2006    (JP) .............. 2006-204576

(51) Int. Cl.
*B63H 21/14*    (2006.01)
*F02F 11/00*    (2006.01)

(52) U.S. Cl. ..................... 440/88 C; 277/592

(58) Field of Classification Search ............. 440/88 C; 277/592, 594, 596, 598; 427/409, 420
See application file for complete search history.

(56) References Cited

U.S. PATENT DOCUMENTS 4,620,995 A * 11/1986 Otomo et al. ............. 427/420
6,682,080 B2 * 1/2004 Miyaoh .................... 277/592
6,851,677 B2 * 2/2005 Miyaoh et al. ............ 277/594
6,983,023 B2 * 5/2005 Kato ....................... 277/592
6,986,516 B2 * 1/2006 Inamura et al. ........... 277/592
7,025,358 B2 * 4/2006 Ueta et al. ................ 277/592
7,044,098 B2 * 5/2006 Amano et al. ............ 277/591
7,131,649 B2 * 11/2006 Sueda ...................... 277/594
7,213,813 B2 * 5/2007 Sueda ...................... 277/594

FOREIGN PATENT DOCUMENTS

JP    03-265764    11/1991
JP    3099828      8/2000

* cited by examiner

*Primary Examiner*—Lars A Olson
(74) *Attorney, Agent, or Firm*—Knobbe, Martens, Olson & Bear, LLP

(57) ABSTRACT

A metal gasket is made up of a backing material made of stainless steel, a galvanizing film is formed on a surface of the backing material, and a sealing rubber film is formed on a surface of the galvanizing film. In one embodiment a silane coupling type vulcanizing adhesive is applied to the surface of the galvanizing film and heated at a temperature of 100° C. to 200° C. for a prescribed period to generate a zinc oxide film on the surface of the galvanizing film and to bake the silane coupling type vulcanizing adhesive. Vinylidene fluoride type rubber containing a polyol type vulcanizing agent can be calcined onto its surface to form the sealing rubber film. The metal gasket can be provided on a mating surface of a cylinder head and a cylinder body of an engine provided in an outboard motor.

14 Claims, 7 Drawing Sheets

[FIG. 1]
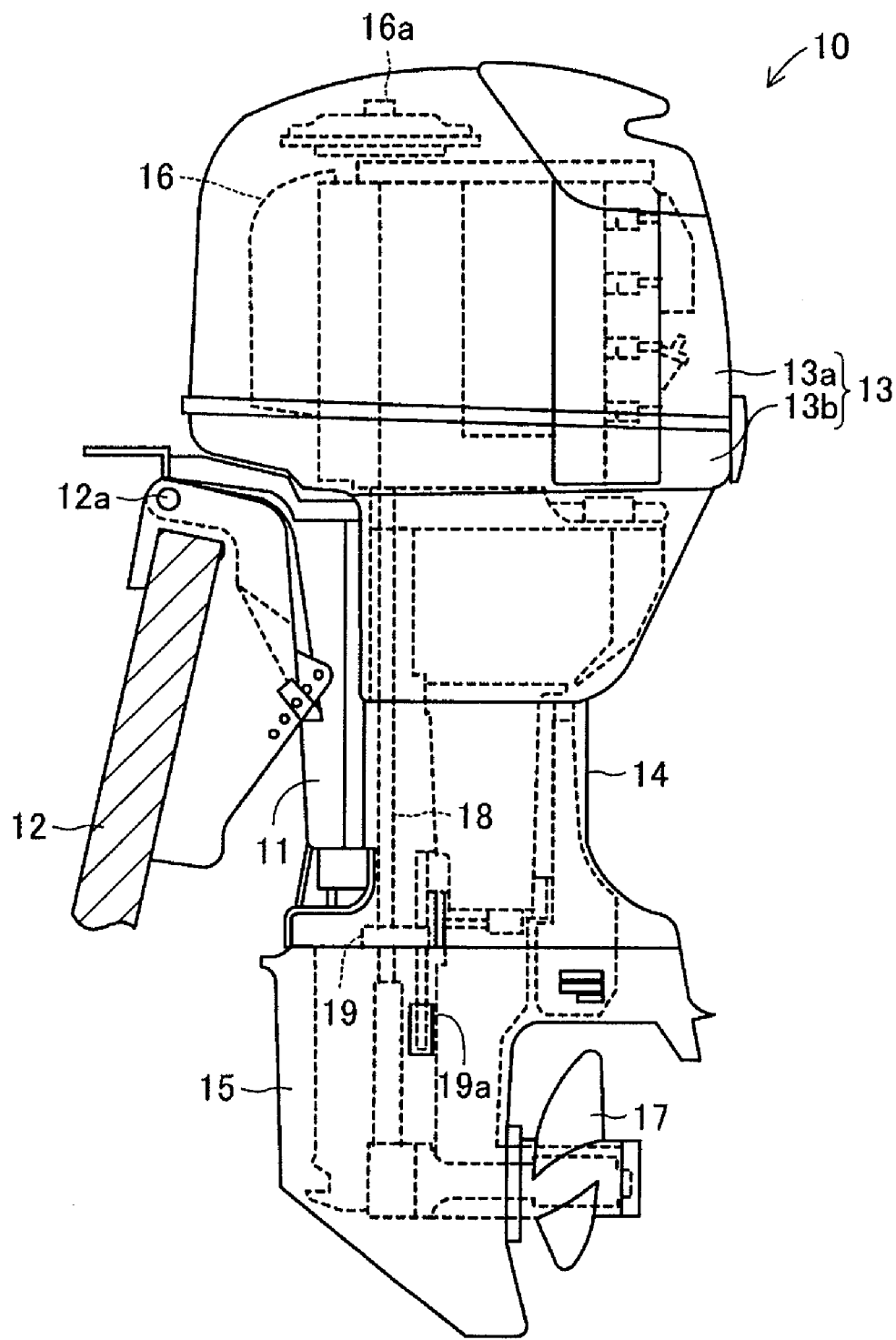

[FIG. 2]
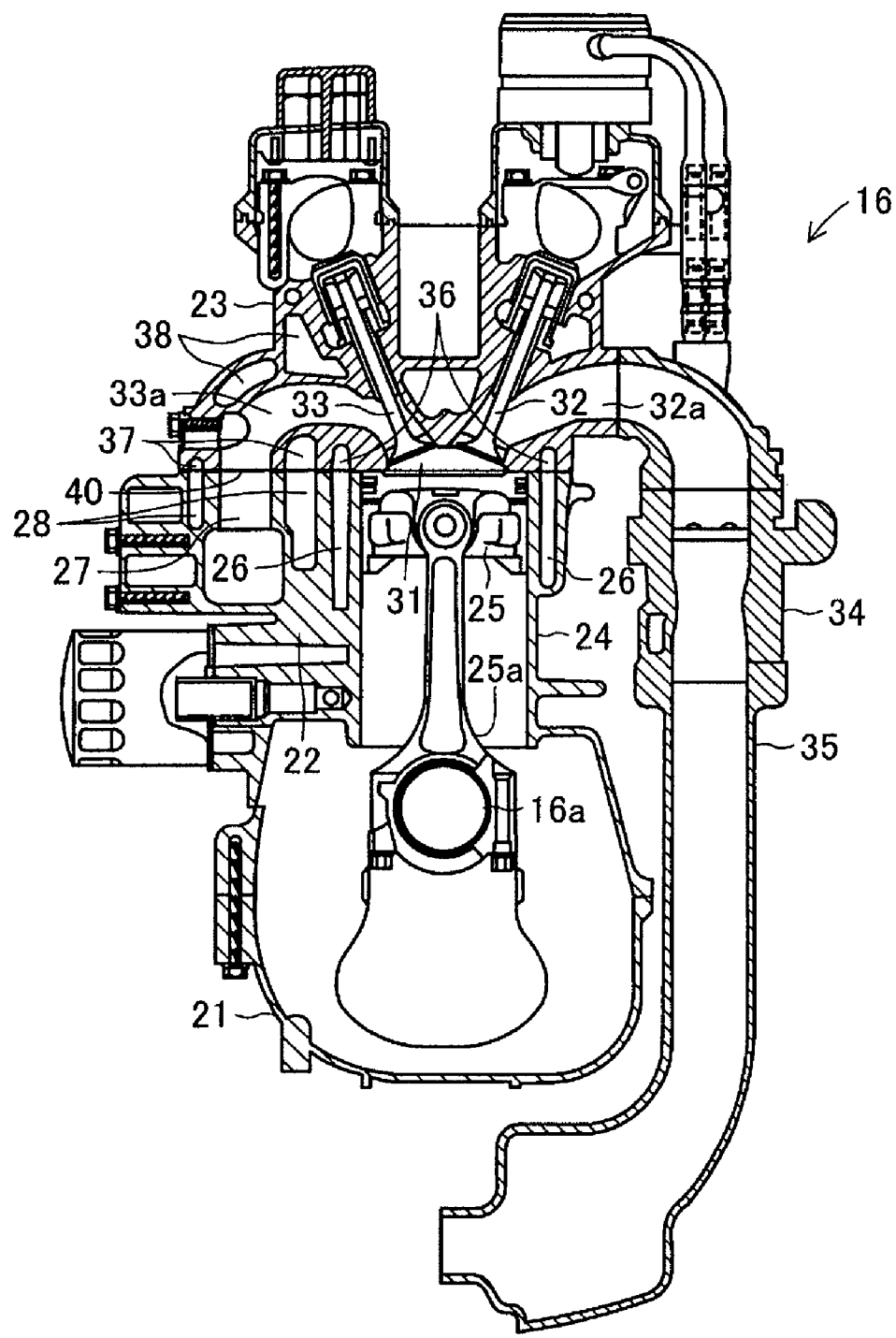

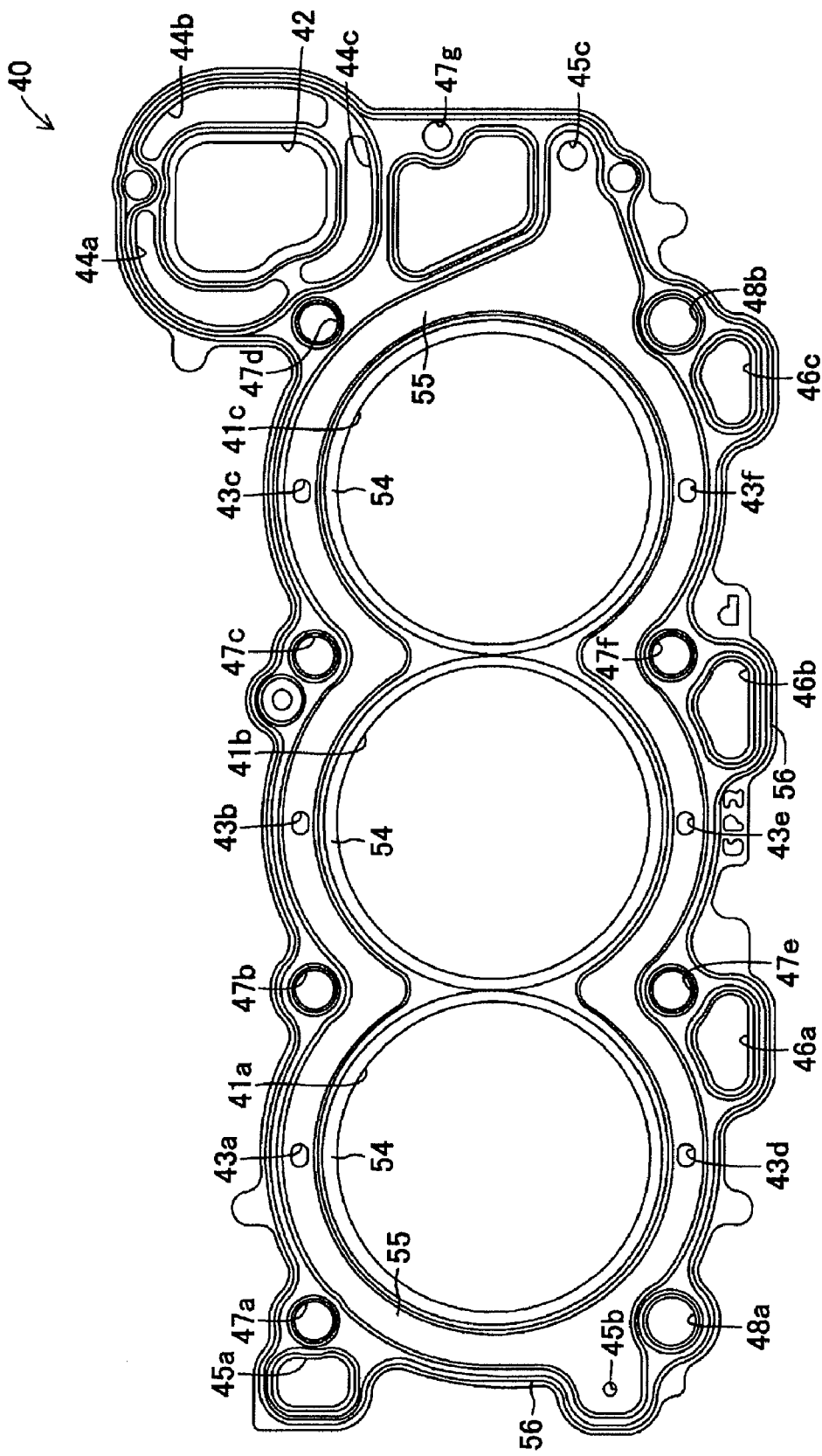
[FIG. 3]

[FIG. 4]
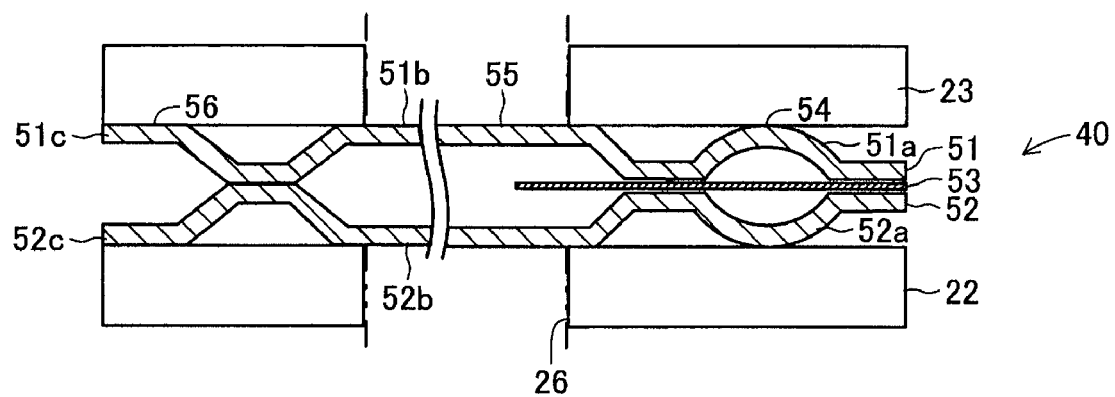

[FIG. 5]
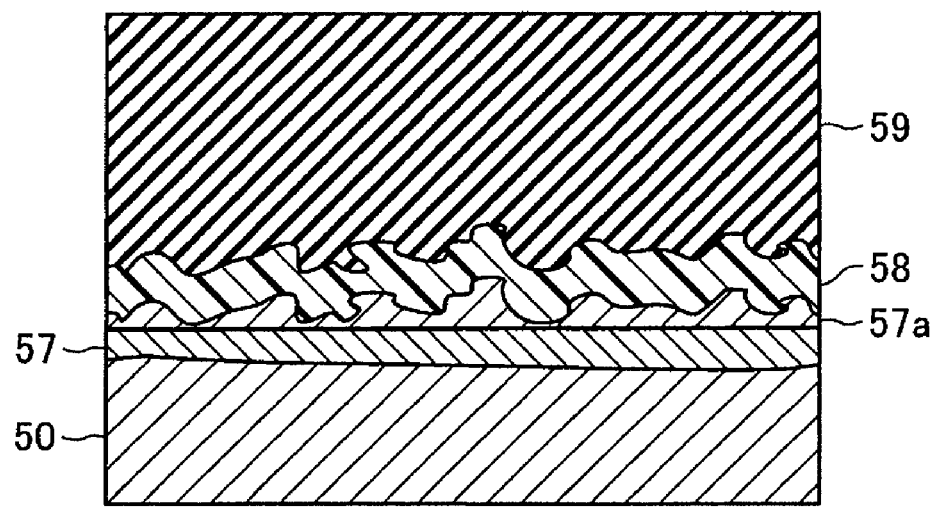

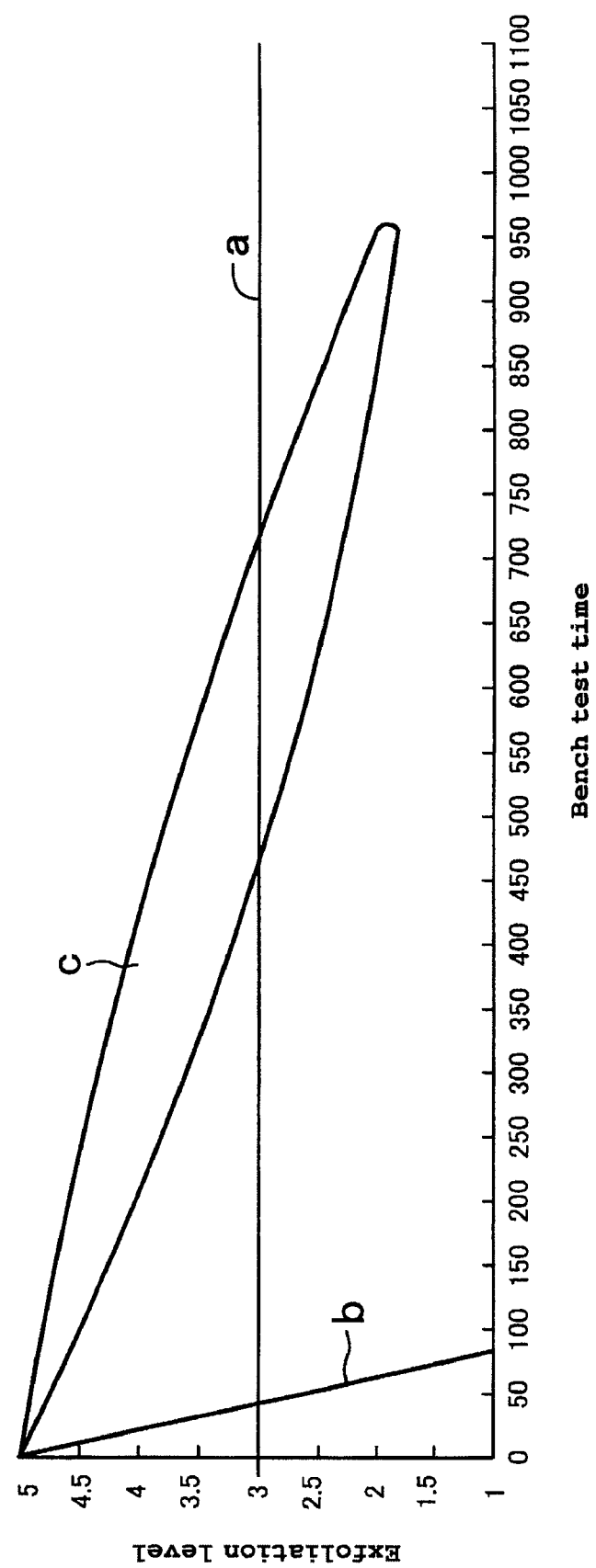
[FIG. 6]

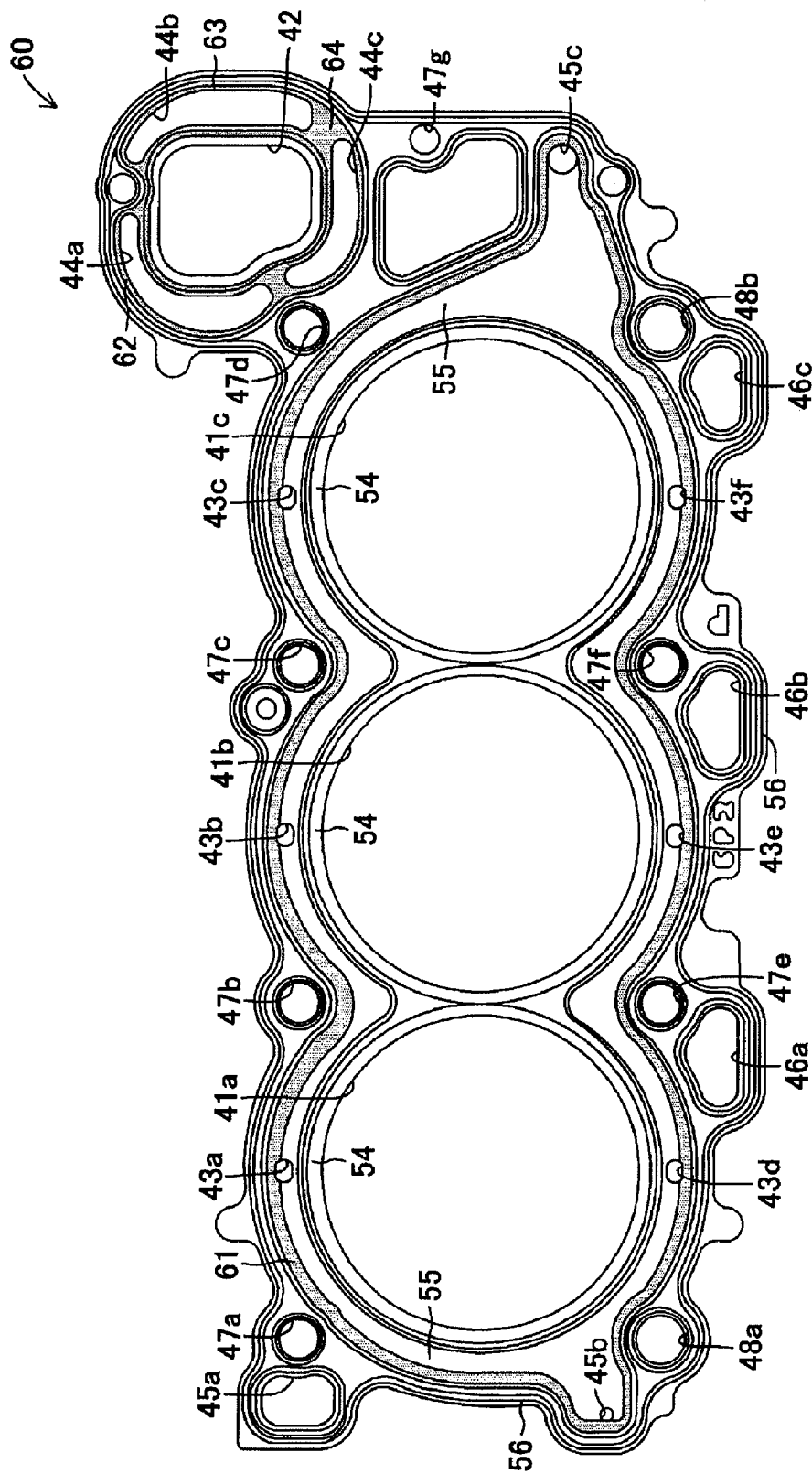
[FIG. 7]

METAL GASKET FOR MARINE ENGINE

CROSS-REFERENCE TO RELATED APPLICATIONS

The present application is based on and claims priority under 35 U.S.C. § 119 to Japanese Patent Application Serial No. 2006-204576, filed on Jul. 27, 2006, the entire contents of which are expressly incorporated by reference herein.

BACKGROUND OF THE INVENTION

1. Field of the Invention

The present invention relates to a metal gasket having a stainless steel backing material and a sealing rubber film on its surface.

2. Description of the Related Art

A main body of an engine for use in a small watercraft can be constructed by, for example, assembling a plurality of case members such as a cylinder head and a cylinder body. A metal gasket for preventing infiltration of coolant is provided on mating surfaces of the cylinder head and the cylinder body. A conventional metal gasket is made up of a stainless steel plate. A composite film having a chromium compound, phosphoric acid and silica as its main components is formed on a surface of the stainless steel plate, and a rubber layer made of a nitrile rubber composite is coated on a surface of the composite film.

SUMMARY OF THE INVENTION

Applicants have noted that a conventional metal gasket as described above is developed for an engine of a vehicle using coolant containing antifreeze, and is not optimal for use in an engine of a watercraft using seawater as coolant. When a conventional metal gasket as mentioned above is provided on mating surfaces of a cylinder head and a cylinder body in a main body of an engine using seawater as coolant, degradation leading to exfoliation may occur between the stainless steel plate as a backing material and the nitrile rubber composite. If the nitrile rubber composite is exfoliated from the stainless steel plate, the stainless steel plate contacts seawater. Applicants have determined that by this contact, the stainless steel plate and the main body of the engine are electrically interconnected via seawater, which makes the main body of the engine susceptible to electrical corrosion.

Accordingly, there is a need in the art of a metal gasket that prevents a sealing rubber film from exfoliating from a backing material even if used as immersed in seawater.

In one embodiment a metal gasket includes: a backing material made of sheet-shaped stainless steel; a galvanizing film formed on a surface of the backing material; and a sealing rubber film formed on a surface of the galvanizing film, in which a silane coupling type vulcanizing adhesive is applied to the surface of the galvanizing film formed on the surface of the backing material and then heated at a temperature of 100° C. to 200° C. for a prescribed period to generate a zinc oxide film on the surface of the galvanizing film and bake the silane coupling type vulcanizing adhesive, and vinylidene fluoride type rubber containing a polyol type vulcanizing agent is calcined onto its surface to form the sealing rubber film.

In one embodiment of a metal gasket as above, the galvanizing film is formed on the surface of the backing material, and the zinc oxide film is generated on the galvanizing film. In this case, the galvanizing film is heated together with the silane coupling type vulcanizing adhesive, so that a part of the former is actively oxidized to generate the zinc oxide film. With this construction, cathodic exfoliation of the sealing rubber film from the stainless steel constituting the backing material can be restricted. For example, in a case in which the metal gasket in which the backing material is made of stainless steel is provided on the mating surface of the main body of the engine made of aluminum alloy and the mating surface is immersed in electrically conductive coolant such as seawater, a corrosive reaction is apt to progress due to a potential difference between different kinds of metals. However, by forming a galvanizing film on the surface of the backing material and generating a zinc oxide film on its surface, the corrosive reaction can be resisted or prevented.

One of the causes for exfoliation of the sealing rubber film from the backing material is degradation of the sealing rubber film itself. Usually, in fluororubber, elimination of fluorine occurs with a crosslinking reaction in a vulcanizing formation. To compensate for the eliminated fluorine, an acid acceptor is added to prevent degradation of the fluororubber. However, when the fluororubber is used under seawater at a high temperature, a crosslinking reaction occurs in the fluororubber to accelerate degradation. Therefore, in a preferred embodiment, vinylidene fluoride type rubber containing a polyol type vulcanizing agent is used as a rubber layer for coating the backing material, and a zinc oxide film functions as an acid acceptor for the eliminated fluorine. Thereby, degradation of the sealing rubber film can be resisted or prevented.

As described, a discovery has been made of such a combination of materials and a production method thereof that exfoliation of the sealing rubber film from the backing material is resisted even when used in seawater. Preferably, silane coupling type vulcanizing adhesive is used as an adhesive for bonding together the galvanizing film formed on the surface of the backing material and the sealing rubber film, and vinylidene fluoride type rubber containing a polyol type vulcanizing agent is used as the sealing rubber film. Thereby, a suitable metal gasket in which exfoliation of the sealing rubber film is resisted can be obtained. Further, by generating a zinc oxide film and baking a silane coupling type vulcanizing adhesive at the same time as in one preferred embodiment, the obtained metal gasket can be made more suitable.

According to another embodiment, two bead plates are laminated together and an inner member is disposed at a prescribed part between the two bead plates. With this construction, the metal gasket embodiment works like a spring or a cushion, and thus the pressure of the contact surface between the metal gasket and the part where the metal gasket is provided is large. Therefore, the sealing by the metal gasket is more secure. Each of the two bead plates preferably is made up of the backing material and each layer such as the sealing rubber film formed on the surface of the backing material. The inner member may be constituted of only the backing material, or may be made up of the backing material and each layer such as the sealing rubber film formed on its surface.

In some embodiments, a gap filling agent is applied to a prescribed part on the surface of the metal gasket. With this construction, the adhesion of the contact surface between the metal gasket and the part where the metal gasket is provided is improved, and the sealing by the metal gasket is further improved.

In some further embodiments, the gasket is provided on a mating surface of a cylinder head and a cylinder body of an engine provided in an outboard motor to seal the mating surface. In this way, there can be obtained an outboard motor including a metal gasket that can prevent exfoliation between the backing material and the sealing rubber film and that can securely seal the mating surface of the cylinder head and the cylinder body.

In accordance with one embodiment, the present invention provides a marine drive comprising an engine and a cooling system. The cooling system is configured to draw water from a body of water in which the marine drive is operated. The engine comprises a cylinder body and a cylinder head that are connected to one another. A metal gasket is disposed between the cylinder body and the cylinder head to effect a seal therebetween. The cylinder body and cylinder head comprise coolant channels for directing water of the cooling system therethrough. The metal gasket comprises a backing material made of a sheet-shaped stainless steel, a galvanizing film formed on a surface of the backing material, and a sealing rubber film formed on a surface of the galvanizing film. The sealing rubber film comprises a zinc oxide film generated by heating a silane coupling type vulcanizing adhesive applied to the surface of the galvanizing film to a temperature between about 100° C. to 200° C. for a prescribed period of time, the silane coupling type vulcanizing adhesive being baked, and a vinylidene fluoride type rubber containing a polyol type vulcanizing agent calcined onto the baked adhesive.

In one embodiment, the metal gasket comprises two bead plates that are laminated together and an inner member disposed between the two bead plates. In another embodiment, the bead plates are generally symmetrical. In a further embodiment a gap filling agent is applied to at least part of a surface of the metal gasket. In some embodiments, the marine drive comprises an outboard motor.

In accordance with another embodiment, a method of making a metal gasket is provided comprising providing a backing material comprising steel, forming a galvanizing film on a surface of the backing material, forming a sealing rubber film on a surface of the galvanizing film, applying a silane coupling type vulcanizing adhesive to the surface of the galvanizing film formed on the surface of the backing material and heating it at a temperature of 100° C. to 200° C. for a prescribed period to generate a zinc oxide film on the surface of the galvanizing film and bake the silane coupling type vulcanizing adhesive, and calcining vinylidene fluoride type rubber containing a polyol type vulcanizing agent onto its surface to form the sealing rubber film.

In some embodiments, the metal gasket comprises two bead plates that are laminated together and an inner member that is disposed between the two bead plates. Another embodiment additionally comprises applying a gap filling agent to a prescribed part on the surface of the metal gasket. In another embodiment, the backing material is formed of sheet-shaped stainless steel.

BRIEF DESCRIPTION OF THE DRAWINGS

FIG. 1 is a side view showing an outboard motor including a metal gasket according to an embodiment of the present invention.

FIG. 2 is a cross-sectional view showing an engine.

FIG. 3 is a plan view showing an embodiment of a metal gasket.

FIG. 4 is a cross-sectional view showing a state where the metal gasket is provided between a cylinder body and a cylinder head.

FIG. 5 is a cross-sectional view showing a surface layer of the metal gasket.

FIG. 6 is a graph showing the results of an endurance test with the invented product and a conventional product.

FIG. 7 is a plan view showing a metal gasket according to another embodiment.

DETAILED DESCRIPTION OF PREFERRED EMBODIMENTS

Some embodiments of the present invention will be described in detail herein with reference to the drawings. FIG. 1 shows an outboard motor 10 including a metal gasket 40 (see FIG. 3) according to the embodiment. The illustrated outboard motor 10 includes a swivel bracket 11 and a clamp bracket 12 that is connected to the swivel bracket 11 and supports the outboard motor 10 via the swivel bracket 11. A steering shaft (not shown) is mounted on the swivel bracket 11 so as to be rotatable around its axis extending generally vertically. The swivel bracket 11 is connected to the approximate center of a side part of a front part of the outboard motor 10 (the side part in the forward direction of the watercraft) via the steering shaft.

The clamp bracket 12 is detachably attached to a stern of a hull (not shown). An upper end of the swivel bracket 11 preferably is connected to an upper end of the clamp bracket 12 via a tilt shaft 12a. That is, the clamp bracket 12 is made up of a pair of members disposed at a prescribed distance to each other in the transverse direction of the hull. The tilt shaft 12a is horizontally laid over the upper ends of the pair of members constituting the clamp bracket 12. At a portion of the tilt shaft 12a between the pair of members constituting the clamp bracket 12, the upper end of the swivel bracket 11 is attached so as to be rotatable around an axis of the tilt shaft 12a.

A housing forming an exterior part of the outboard motor 10 is made up of a cowling 13 including a top cowl 13a and a bottom cowl 13b constituting an upper part, an upper case 14 constituting a center part, and a lower case 15 constituting a lower part. An engine 16 is accommodated inside the cowling 13. A propeller or screw 17 is provided in the lower case 15. The upper case 14 accommodates a motive power transmitting mechanism made up of a drive shaft 18 and so forth for transmitting a drive forth from the engine 16 to the screw 17.

The illustrated engine 16 is a water-cooled engine having three cylinders, and a crankshaft 16a extending in the vertical direction is disposed inside it. The drive shaft 18 is connected to a lower end of the crankshaft 16a. Therefore, when the engine 16 is driven, the crankshaft 16a revolves and the revolution power is transmitted to the screw 17 via the drive shaft 18. A coolant pump 19 is provided in a lower end part of the illustrated upper case 14. A water intake port 19a for introducing coolant (seawater) preferably is formed in the lower case 15. Coolant (seawater) can be introduced from the water intake port 19a by operating the coolant pump 19. The engine 16 can then be cooled down by the sent coolant.

In a preferred embodiment, the engine 16 is constructed as shown in FIG. 2. An outer shell constituting a main part of the engine 16 is made up of a cylinder body 22 and a cylinder head 23 mounted to an upper part (upper part in FIG. 2) of a crankcase 21 accommodating the crankshaft 16a. The main part of the engine 16 is made of an aluminum alloy. At the approximate center inside the cylinder body 22, three cylinders 24 (only one is shown) constituting a cylinder forming recess are formed in a line. In each cylinder 24, a piston 25 connected to the crankshaft 16a via a connecting rod 25a is accommodated so as to be movable in the vertical direction. This vertical movement of the piston 25 is transmitted to the crankshaft 16a to revolve the crankshaft 16a.

A coolant channel 26 is formed around an upper part of the cylinder 24 in the cylinder body 22. An exhaust path 27 is formed at one outer side (left side in FIG. 2) of the coolant channel 26 in the cylinder body 22. A coolant channel 28 is also formed around the exhaust path 27. Three combustion chambers 31 (only one is shown) communicatively connected to the respective cylinders 24 are formed at the center of a lower part of the cylinder head 23. An intake valve 32 and an exhaust valve 33 are provided at an upper part of each combustion chamber 31. An intake port 32a communicatively connected to the intake valve 32 of each cylinder 24 is connected to an intake device made up of a carburetor 34, an intake pipe 35 and so forth. An exhaust port 33a communicatively connected to the exhaust valve 33 is connected to an exhaust device made up of the exhaust path 27 and so forth.

In this embodiment, the intake valve 32 opens at an intake stroke and sends an air-fuel mixture containing air supplied from the intake device and fuel supplied from a fuel tank (not shown) into the cylinder 24. The exhaust valve 33 opens at an exhaust stroke and sends exhaust gas discharged from the cylinder 24 out to the exhaust device. The engine 16 includes an ignition device (not shown) and the air-fuel mixture explodes when ignited by the ignition device. With this explosion, the piston 25 moves up and down and the movement causes the crankshaft 16a to revolve.

In the illustrated engine, a coolant channel 36 communicatively connected to the coolant channel 26 is formed in a lower part of the cylinder head 23 facing the coolant channel 26. A coolant channel 37 communicatively connected to the coolant channel 28 is formed in a lower part of the cylinder head 23 facing the coolant channel 28. In addition, a coolant channel 38 is formed at one outer side of the exhaust valve 33 in the cylinder head 23. All of these coolant channels 26, 28, 36, 37, and 38 are communicatively connected to form a single channel. Coolant introduced from the water intake port 19a by operation of the coolant pump 19 flows inside this channel, and thereby the engine 16 is cooled down. An oil channel (not shown) for supplying lubricating oil to the engine 16 is also formed in the main part of the engine 16.

A metal gasket 40 is provided on the mating surface of the cylinder body 22 and the cylinder head 23. The metal gasket 40 configured for the illustrated engine is constructed as shown in plan view in FIG. 3. Bores 41a, 41b, and 41c with the size same as a bore of the cylinder 24 are formed at parts corresponding to the respective cylinders 24, such that distances between the bores are the same as those between the three cylinders 24. A gas port 42 with the size same as a hole of the exhaust path 27 is formed at a part of the metal gasket 40 corresponding to the exhaust path 27.

At a part of a peripheral part of the bores 41a, 41b, and 41c corresponding to the coolant channels 26 and 36 in the metal gasket 40, small elliptic coolant ports 43a, 43b, 43c, 43d, 43e and 43f are formed at a prescribed distance to each other. At a peripheral part of the gas port 42 corresponding to the coolant channels 28 and 37 in the metal gasket 40, narrow and generally arcuate coolant ports 44a, 44b, and 44c are formed at a distance to each other.

Further, coolant ports 45a, 45b, and 45c different in size or shape from each other are formed at respective ends of the metal gasket 40 except for an end on the gas port 42 side. At parts of the metal gasket 40 corresponding to the oil channels, three generally triangular oil ports 46a, 46b, and 46c are formed at a prescribed distance to each other in a line. Six bolt holes 47a, 47b, 47c, 47d, 47e, 47f, and 47g are formed keeping a distance to each other at parts of the metal gasket 40 corresponding to outer peripheral parts of the coolant channels 26 and 36.

Two through holes 48a and 48b are formed on both sides of the bolt holes 47e and 47f in such a manner as to interpose the bolt holes 47e and 47f therebetween, at generally the same distance to each other as that between the bolt holes 47e and 47f. The bolt holes 47a, 47b, 47c, 47d, 47e, 47f, and 47g allow insertion of bolts (not shown) for connecting the cylinder body 22 and cylinder head 23 together. The through holes 48a and 48b allow insertion of positioning pins (not shown) for positioning the cylinder body 22 and the cylinder head 23.

As shown in FIG. 4, the metal gasket 40 formed with various holes as described above is formed by sandwiching a sheet-shaped shim member 53 as an inner member at a prescribed part between sheet-shaped bead plates 51 and 52 disposed in a laminating manner. The bead plates 51 and 52 and the shim member 53 are constituted of a stainless steel plate on which surface a coating layer of a sealing rubber film 59 (see FIG. 5) is formed. The bead plates 51 and 52 are each about 0.2 mm thick, and the shim member 53 is about 0.1 mm thick.

The bead plates 51 and 52 preferably are symmetrical vertically (in the vertical direction of FIG. 4). Protrusions 51a, 51b, and 51c are formed to protrude upward at prescribed parts of the bead plate 51. Protrusions 52a, 52b, and 52c are formed to protrude downward at prescribed parts of the bead plate 52. The protrusions 51a and 52a have an arcuate, curved shape. The protrusions 51b, 51c, 52b, and 52c have a trapezoidal, tabular shape. It is to be understood that in other embodiment, different bead shapes, sizes, and configurations may be employed.

In the illustrated embodiment, a main bead 54 is formed by the protrusion 51a, the protrusion 52a, and the shim member 53 positioned between them. A subbead 55 is formed by the protrusion 51b, the protrusion 52b, and a part of the shim member 53 positioned between them. A half bead 56 with an open end is formed by the protrusion 51c and the protrusion 52c. The main bead 54, the subbead 55 and the half bead 56 are formed at a plurality of parts of the metal gasket 40 as shown in FIG. 3.

Surfaces of the bead plate 51 and 52 are constructed as shown in FIG. 5. That is, a backing material 50 of the bead plates 51 and 52 is constituted of sheet-shaped stainless steel. A galvanizing film 57 is formed on a surface of the backing material 50 (upper surface in FIG. 5). A zinc oxide film 57a preferably is formed on a surface of the galvanizing film 57. A sealing rubber film 59 preferably is formed on a surface of the zinc oxide film 57a via an adhesive layer 58. The galvanizing film 57 is formed on the entire surface of the backing material 50, and preferably is about 0.5 μm to 10 μm thick.

The sealing rubber film 59 is formed onto the backing material 50 on which surface the galvanizing film 57 is formed as follows. First, a silane coupling type vulcanizing adhesive is applied to the surface of the galvanizing film 57. Subsequently, the backing material 50 on which surface the galvanizing film 57 is formed and the silane coupling type vulcanizing adhesive is applied preferably is heated at a temperature of about 100° C. to 200° C. for several minutes. Thereby, the zinc oxide film 57a is generated and the silane coupling type vulcanizing adhesive is baked at the same time. Next, vinylidene fluoride type rubber containing a polyol type vulcanizing agent preferably is applied to a surface of a baked layer of the silane coupling type vulcanizing adhesive. This is calcined at a prescribed temperature.

With this, the adhesive layer 58 and the sealing rubber film 59 are formed on the surface of the zinc oxide film 57a and the bead plates 51 and 52 are obtained. The adhesive layer 58 preferably is about 0.5 μm to 5 μm thick. The sealing rubber film 59 preferably is about 5 μm to 50 μm thick.

In a preferred embodiment, the metal gasket 40 constructed as described above is provided in a gap between the cylinder body 22 and the cylinder head 23 with the main bead 54 around the bores 41a, 41b, 41c. The subbead 55 generally covers the coolant channels 26 and 36 (but includes ports 43a, 43b, 43c, 43d, 43e, 43f) and edges of the mating surface of the cylinder body 22 and the cylinder head 23. The open end of the half bead 56 preferably is generally flush with outer edges of the mating surface of the cylinder body 22 and the cylinder head 23.

An endurance test was conducted on the metal gasket 40 and a conventional metal gasket (conventional product) to compare their conditions of exfoliation of the sealing rubber film 59. The results are shown in FIG. 6. In FIG. 6, the exfoliation level represented along the vertical axis indicates a level of the condition of exfoliation that occurred to a coating layer such as the sealing rubber film 59 on the backing material 50 or the like in the metal gasket 40 or the like. A number "5" indicates a condition of a new product that has no exfoliation. A number "3" indicates a condition that exfoliation of about 10% has occurred. A number "1" indicates a condition that the coating layer has mostly exfoliated. The level 3 indicated by the line "a" is the lower limit of the level where the metal gasket 40 or the like is usable.

The horizontal axis in FIG. 6 represents elapsed time, and indicates time under the condition that the endurance test was conducted (the test was conducted in a test room with each device prescribed on a prescribed bench). The line "b" indicates the result of the conventional product. The area "c" indicates the result of the metal gasket 40 embodiment as set out above. This results shown in FIG. 6 indicates that providing the metal gasket 40 with the bead plates 51 and 52 including each layer such as the zinc oxide film 57a and so forth resists exfoliation of the sealing rubber film 59 of the metal gasket 40, and greatly improves the durability of the metal gasket 40.

As described above, in the metal gasket 40 according to this embodiment, the galvanizing film 57 is formed on the surface of the backing material 50, and the zinc oxide film 57a is generated on the surface of the galvanizing film 57. The sealing rubber film 59 is formed on the surface of the zinc oxide film 57a via the adhesive layer 58. Thereby, exfoliation of the sealing rubber film 59 due to a corrosive reaction to the backing material 50 is prevented.

Vinylidene fluoride type rubber containing a polyol type vulcanizing agent is used as the sealing rubber film 59 for coating the backing material 50 and the zinc oxide film 57a is generated on the surface of the galvanizing film 57. Thereby, degradation of the sealing rubber film 59 is prevented. Further, the metal gasket 40 is made up of the two bead plates 51 and 52 that are laminated together and the shim member 53 disposed at a prescribed part between the two bead plates 51 and 52. Thus the metal gasket 40 in the illustrated embodiment works like a spring or a cushion. As a result, the pressure of the contact surface between the metal gasket 40 and the mating surface of the cylinder body 22 and the cylinder head 23 is large, and thus the sealing of the mating surface of the cylinder body 22 and the cylinder head 23 by the metal gasket 40 is more secure. It is to be understood, however, that a metal gasket having layers as discussed herein but not configured to act as a spring will still resist degradation and may be useful in certain applications.

FIG. 7 shows a metal gasket 60 according to another embodiment of the present invention. The metal gasket 60 is constructed such that a gap filling agent is applied to a prescribed part on face and back surfaces of a metal gasket that is similar or identical to the metal gasket 40. As such, parts that are similar to those of the metal gasket 40 will be described with the same reference numerals and symbols. A gap filling agent layer 61 (a gap filling agent layer on the back side is not shown) is formed each on the face and back surfaces of the metal gasket 60 at and in the vicinity of border parts between the mating surface of the cylinder body 22 and the cylinder head 23 and the coolant channels 26 and 36, in such a manner as to surround the coolant channels 26 and 36.

Gap filling agent layers 62, 63, and 64 (gap filling agent layers on the back side are not shown) are formed each on the face and back surfaces of the metal gasket 60 at and in the vicinity of border parts between the mating surfaces of the cylinder body 22 and the cylinder head 23 and the coolant ports 44a, 44b, and 44c, in such a manner as to surround the coolant ports 44a, 44b, and 44c, respectively. That is, these gap filling agent layers 61, 62, 63, and 64 are each formed on the surface of the subbead 55.

Therefore, the mating surface of the cylinder body 22 and the cylinder head 23 more tightly adheres to the subbead 55 that contacts the mating surface via the gap filling agent layers 61, 62, 63, and 64. The metal gasket 60 provides more secure sealing therebetween. In one embodiment, Sunbond 1040 (a product of Suntechno Co., Ltd.) can be used as the gap filling agent layers 61, 62, 63, and 64. Other functions and effects of the metal gasket 60 are preferably the same or similar to those of the metal gasket 40 according to the embodiment described above.

The metal gasket according to the present invention is not limited to the embodiments described above, and may be modified appropriately. For example, the metal gasket is provided to the outboard motor 10 in the embodiments described above. However, the metal gasket may be used in watercrafts such as small plaining boats in which an engine is provided in a hull. In addition, the metal gasket may be suitably used in other types of engines in which seawater is used as coolant. For example, V-type or in-line engines having any number of cylinders, or even rotary engines or other configurations, can benefit from metal gaskets as described herein. Further, the arrangement, structure, material and so forth of each part constituting the metal gasket according to the present invention may be modified appropriately within the technical scope of this application.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A marine drive comprising an engine and a cooling system, the cooling system configured to draw water from a body of water in which the marine drive is operated, the engine comprising a cylinder body and a cylinder head that are connected to one another, and a metal gasket is disposed between the cylinder body and the cylinder head to effect a seal therebetween, the cylinder body and cylinder head comprising coolant channels for directing water of the cooling system therethrough, the metal gasket comprising a backing material made of a sheet-shaped stainless steel, a galvanizing film formed on a surface of the backing material, and a sealing rubber film formed on a surface of the galvanizing film, wherein the sealing rubber film comprises a zinc oxide film generated by heating a silane coupling type vulcanizing adhesive applied to the surface of the galvanizing film to a temperature between about 100° C. to 200° C. for a prescribed period of time, the silane coupling type vulcanizing adhesive being baked, and a vinylidene fluoride type rubber containing a polyol type vulcanizing agent calcined onto the baked adhesive.

2. A marine drive as in claim 1, wherein the metal gasket comprises two bead plates that are laminated together and an inner member disposed between the two bead plates.

3. A marine drive as in claim 2, wherein the bead plates are generally symmetrical.

4. A marine drive as in claim 2, wherein a gap filling agent is applied to at least part of a surface of the metal gasket.

5. A marine drive as in claim 4, wherein the marine drive comprises an outboard motor.

6. A marine drive as in claim 1, wherein a gap filling agent is applied to at least part of a surface of the metal gasket.

7. A marine drive as in claim 1, wherein the marine drive comprises an outboard motor.

8. A method of making a metal gasket comprising providing a backing material comprising steel, forming a galvanizing film on a surface of the backing material, forming a sealing rubber film on a surface of the galvanizing film, applying a silane coupling type vulcanizing adhesive to the surface of the galvanizing film formed on the surface of the backing material and heating it at a temperature of 100° C. to 200° C. for a prescribed period to generate a zinc oxide film on the surface of the galvanizing film and bake the silane coupling type vulcanizing adhesive, and calcining vinylidene fluoride type rubber containing a polyol type vulcanizing agent onto its surface to form the sealing rubber film.

9. The method according to claim 8, wherein the metal gasket comprises two bead plates that are laminated together and an inner member that is disposed between the two bead plates.

10. The method according to claim 9 additionally comprising applying a gap filling agent to a prescribed part on the surface of the metal gasket.

11. The method according to claim 9, wherein the backing material is formed of sheet-shaped stainless steel.

12. The method according to claim 10 additionally comprising fitting the metal gasket onto a mating surface of a cylinder head and a cylinder body of an engine provided in an outboard motor to seal the mating surface.

13. The method according to claim 8 additionally comprising applying a gap filling agent to a prescribed part on the surface of the metal gasket.

14. The method according to one claim 8 additionally comprising fitting the metal gasket onto a mating surface of a cylinder head and a cylinder body of an engine provided in an outboard motor to seal the mating surface.

\* \* \* \* \*